United States Patent [19]
Singhal et al.

[11] Patent Number: 5,333,012
[45] Date of Patent: Jul. 26, 1994

[54] MOTION COMPENSATING CODER EMPLOYING AN IMAGE CODING CONTROL METHOD

[75] Inventors: Sharad Singhal, Mendham, N.J.; Hiroshi Watanabe, Kanagawa, Japan

[73] Assignees: Bell Communications Research, Inc., Livingston, N.J.; Nippon Telegraph and Telephone Corporation, Tokyo, Japan

[21] Appl. No.: 961,110

[22] Filed: Oct. 14, 1992

[30] Foreign Application Priority Data

Dec. 16, 1991 [JP] Japan .................... 3-331933

[51] Int. Cl.⁵ .......................................... H04N 7/12
[52] U.S. Cl. ................................................. 348/405
[58] Field of Search .................... 358/136, 133, 105

[56] References Cited

U.S. PATENT DOCUMENTS 5,136,376 8/1992 Yagasaki et al. ................... 358/133

OTHER PUBLICATIONS

"Coding for Moving Pictures and Associated Audio," ISO/IEC JTC 1/SC 29 N 071 pp. 2-A-18, Dec. 6, 1991.
"Visual Telephony as an ISDN Application," Ming L. Liou IEEE Communications Magazine, pp. 30-38, Feb. 1990.
"MPEG Simulation Model Three (SM3),"Simulation Model Editorial Group, International Organization for Standardization, ISO-IEC/JTC1/SC2/WG11, pp. 54-55, Jul. 25, 1990.
"Transmission of Component-Coded Digital Television Signals for Contribution-Quality Applications at the Third Hierarchical Level of CCITT Rec G.702, " CMTT 303-E, pp. 1-18, Oct. 17, 1989.
"Description of Ref. Model 8 (RM8)," Specialist Group, on Coding for Visual Telephony CCITT SGXV Working Party XV/4, Document 525, pp. 28-30, Jun. 9, 1989.
"Codec for Audiovisual Services as n x 384 kbit/s," Rec. H.261, pp. 120-128, 1988.

Primary Examiner—Tommy P. Chin
Assistant Examiner—E. Lenchak
Attorney, Agent, or Firm—Leonard Charles Suchyta; Loria B. Yeadon

[57] ABSTRACT

A motion compensating coder which includes a control section for setting quantizer step size accounts for both the buffer occupancy and the texture of the image being coded. The coding control method, using well-accepted assumptions relating to the human visual sensitivity to quantization distortion in an image, employs a recursive strategy that maintains a coding rate which closely approximates the number of target bits.

14 Claims, 7 Drawing Sheets

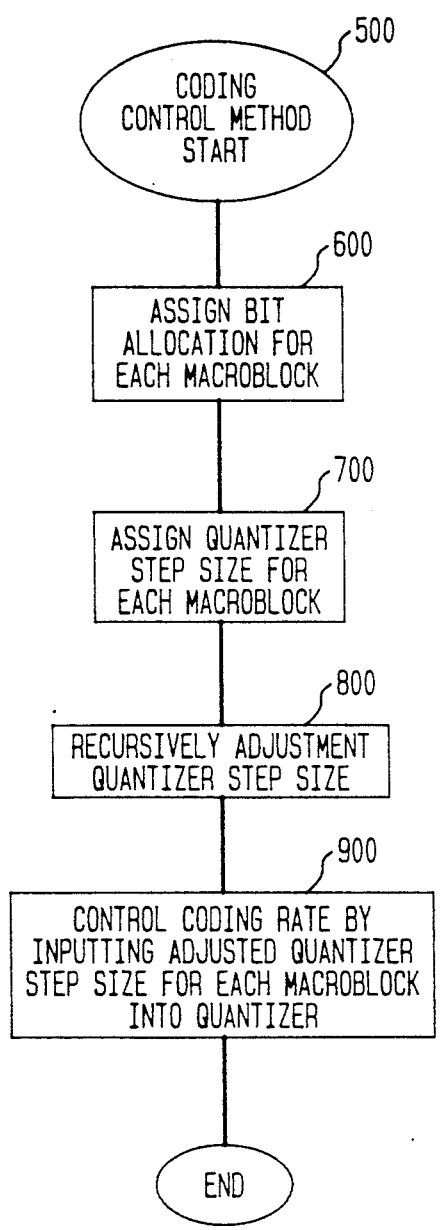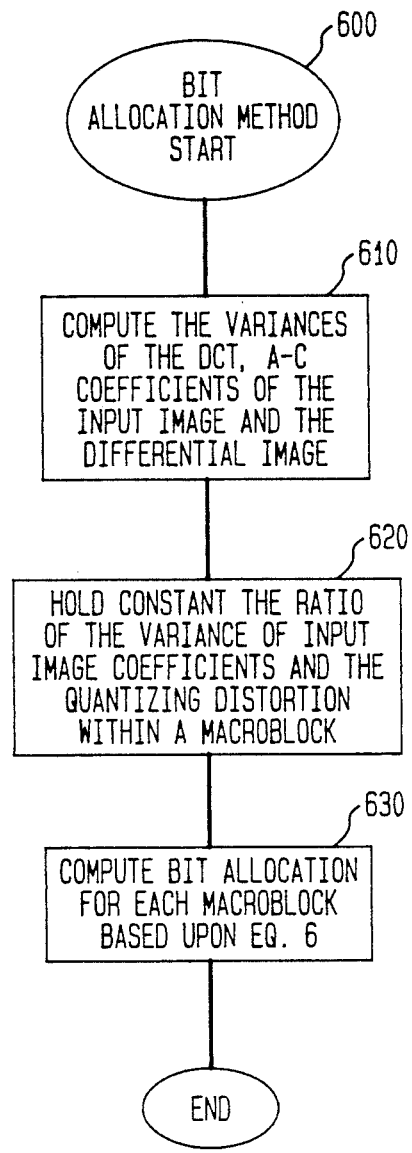

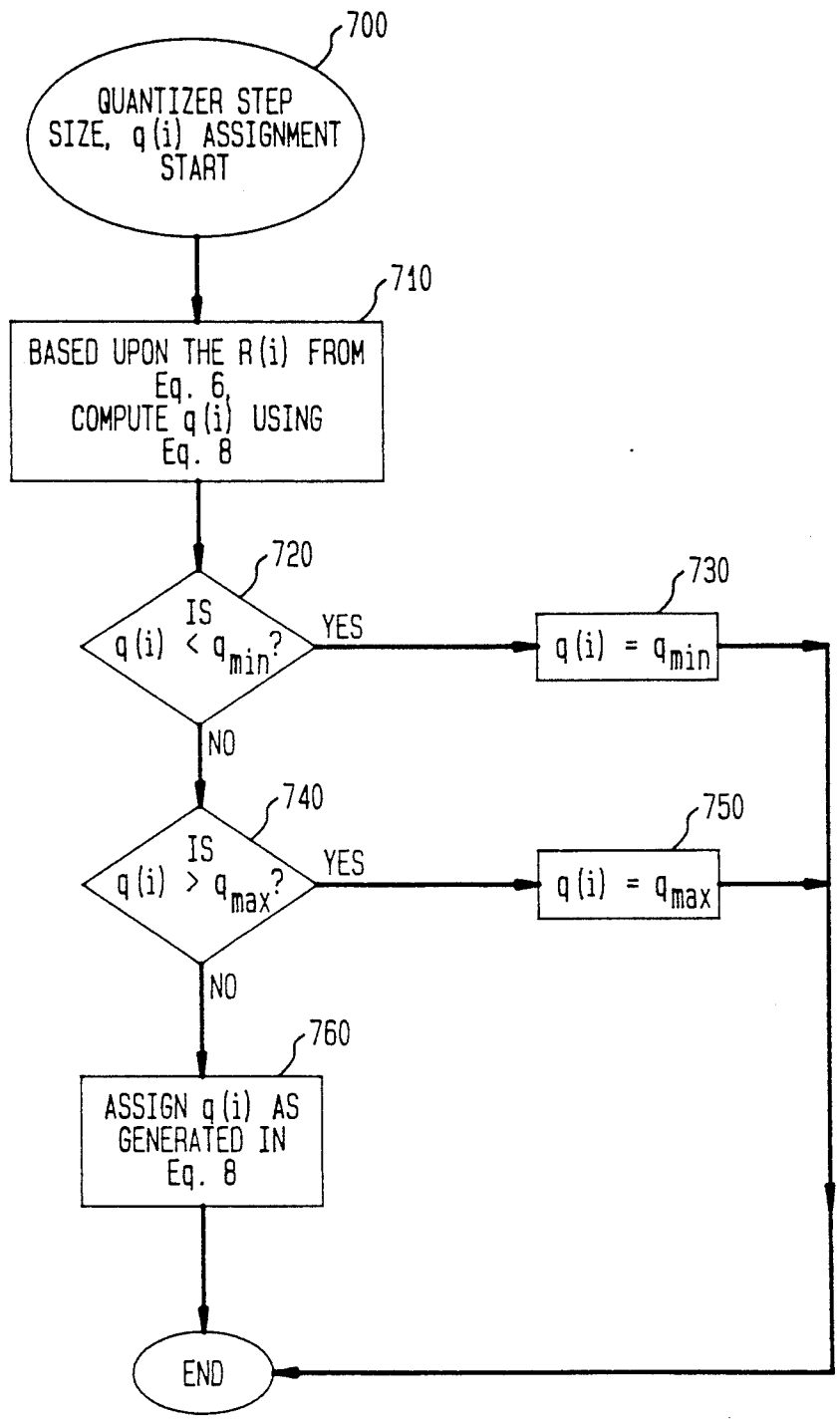

MOTION COMPENSATING CODER EMPLOYING AN IMAGE CODING CONTROL METHOD

FIELD OF THE INVENTION

This invention relates to an apparatus and method for coding video signals and more particularly to a coder employing motion compensation and an image coding control method for maintaining a constant coding rate.

BACKGROUND OF THE INVENTION

Motion compensation is known to have a high coding efficiency and is often used in combination with orthogonal transforms, such as the discrete cosine transform (DCT), for encoding full-motion video. For example, CCITT H.261 ("Codec for Audiovisual Services at n×384 kbit/s," Rec. H.261, pgs. 120-128, 1988), CCITT Rec. G.702 ("Transmission of Component-Coded Digital Television Signals for Contribution-Quality Applications at Third Hierarchical Level of CCITT Recommendation G.702," CMTT 303-E, pgs. 1-18, Oct. 17, 1989), and the ISO Draft International Standard (DIS) 41172 ("Coding for Moving Pictures and Associated Audio," ISO/IEC JTC 1/SC 29 N 071, pgs. 2-A-18, Dec. 6, 1991) all employ a hybrid coding method in which DCT is applied to motion-compensated differential signals. A DCT interframe coder representative of coders from the prior art as described in "Visual Telephony as an ISDN Application," Ming L. Liou, IEEE Communications Magazine, pgs 30-38, February 1990, is shown in FIG. 1.

Video coders that are used in standards such as the CCITT H.261 and the ISO DIS 41172 are inherently variable rate coders because the parameters in the coder are coded using Variable Length Coding (VLCs) 200. As shown in FIG. 1, the variable length coded signals are buffered at buffer 300. The buffer occupancy (the quantity of generated bits) is fed back via lead 301 to the rate controller 150. The rate controller 150 adjusts the quantization step size in quantizer 11 to avoid buffer overflow or underflow while maintaining a constant rate at the output 302 of the buffer 300.

A control method, which maintains a constant coding rate by adjusting the quantizer step size based upon buffer occupancy, is commonly used in video coders referenced in various standards. For example, the Reference Model 8 ("Description of Ref. Model 8 (RM8), CCITT SGXV Working Party XV/4, Document 525, pgs. 28-30, Jun. 9, 1989) as used in recommended operations in CCITT H.261 and the Simulation Model 3 (SM3) for the ISO DIS 41172 employ this method of rate control. Under this rate control method, the quantizer step size is calculated by dividing the buffer occupancy by a predetermined value obtained empirically through experiments.

The quantizer step size is transmitted as part of the output bit stream, appearing at output 302, several times every frame for each group of blocks (GOB) in the H.261 method and for each slice in the ISO DIS 41172 method and is used to control the coding rate. In the industry, a slice refers to one or more adjacent horizontal row of macroblocks within a frame of video, and a GOB refers to several rows and columns of macroblocks within a frame of video. After processing of each slice or GOB, the buffer occupancy can be determined, which is the number of bits actually generated to encode the slice or GOB. The number of target bits is pre-assigned according to the interval between intra-coded pictures and the type of picture, which can be inferred from the type of method used to encode the picture (such as intraframe coding, interframe prediction coding, and interframe interpolation prediction coding).

The aforementioned rate control method, which adjusts quantization step size based on buffer occupancy, has the following shortcomings:

1) Adjustments in the quantizer step size is based solely on the buffer occupancy, but does not take the content (texture) of the image into account. As a result, the distribution of visual distortion over the image is not uniform and viewer perception of picture quality is detrimentally affected.

2) Transition from one quantizer step size to the next quantizer step size is not necessarily smooth because quantizer step size is directly controlled by the buffer occupancy calculated for the previous slice (or GOB). Thus, the number of bits generated to code a slice or GOB governs the quantization of the next slice or GOB.

3) Although both the ISO DIS 41172 and CCITT H.261 standards allow updating quantizer step sizes more frequently, if necessary, by using additional overhead information, the aforementioned rate control strategy does not satisfactorily handle boundary changes in image content occurring midway through a slice (or GOB). For example, a slice which includes the boundary between a clear blue sky (a flat, low texture image) and a flower garden (a high resolution, high texture image) cannot be accommodated with the aforementioned rate control method, because the method depends only on the buffer occupancy and does not take image content into account.

4) In the Simulation Model 3 (SM3), the quantizer step size is calculated by dividing the buffer occupancy by 2000. This value, however, is empirical; it was obtained through experiments and does not guarantee that the total bits generated will be sufficiently close to the number of target bits to prevent buffer overflow and underflow.

5) Lastly, in the Simulation Model 3 (SM3) which employs intraframe coding, a large number of bits are generated and data in the first slice of the next frame is coded with a large quantizer step size regardless of the image content causing pronounced coding distortion on the upper part of the image. If a slice contains both high-texture and low-texture patterns, more pronounced coding distortion in the slice results under this method. Since slices in the lower part of the image are coded after adjustments have been made in the quantizer step size, the slices in the lower part of the image appear to have much less distortion than slices in the upper part of the image. Images having such boundaries and such a difference in the distortion between upper and lower parts of the images are perceived by viewers to have a worse overall picture quality than an evenly distorted image.

SUMMARY OF THE INVENTION

In view of these shortcomings, an object of this invention is a coder employing motion-compensation and a coding control method which provide improved quality in the coded image. Quality improvements result since bits are allocated for coding different segments of the image, called macroblocks, in accordance with 1) the degree of local activity (or texture) in the macroblocks and 2) the buffer occupancy while maintaining a target bit rate for each slice or frame of video. The coder of our invention builds upon conventional DCT interframe coders from the prior art, but also includes an additional DCT component operating on the input image, a variance component, and an inventive coding controller. The combined processing of these components allocates bits based upon the local activity in the image and buffer occupancy, assigns quantizer step size and adjusts quantizer step size to maintain a constant coding rate.

Our bit allocation and rate control method are based upon a well-accepted assumption about the human visual system that human visual sensitivity to quantization distortion in an image is inversely proportional to the local activity (texture) of the image. In determining the level of permitted distortion in each macroblock, we also assume, based on empirical observations, that the local texture in the macroblock can be measured by the variance of the A-C coefficients resulting from the DCT of the macroblock.

Rate-distortion theory is used to allocate bits to each macroblock, subject to the constraint that the total number of bits used to encode the entire slice or frame of video does not exceed the number of bits allocated for the slice or frame. The quantizer step size initially set for each macroblock is based upon the number of allocated bits and the variance of the DCT coefficients in the macroblock. A recursive rate control strategy, which permits fine adjustments in the quantizer step size, is used to achieve a coding rate which closely approximates the target bit rate. Adjustments are made in the quantizer step size to accommodate boundary changes occurring within a macroblock.

BRIEF DESCRIPTION OF THE DRAWINGS

FIGS. 4A, 4B, 4C and 4D show flow diagrams of our image coding control method for allocating bits, adjusting quantizer step size, and controlling the coding rate in accordance with an aspect of our invention.

DETAILED DESCRIPTION OF THE INVENTION

The coder of our invention employs a coding control method based upon well-accepted assumptions about the sensitivity of the human visual system to distortion. Our inventive coder and coding control method build upon conventional DCT interframe strategies from the prior art. Although our coder and method are equally applicable to multiple techniques that use transforms other than DCT to encode video signals in segments, for the purpose of an illustrative example the following description is based upon the coder and coding scheme from the ISO 41172 video standard implementing motion compensation and DCT.

The coder and method of our invention are described by first discussing the coder of our invention (Section A) followed by a discussion of our bit allocation method and the supporting assumptions regarding human visual sensitivity to quantization distortion (Section B). The method of assigning quantizer step size for each macroblock is discussed in Section C, and the recursive quantizer step size adjustment method for controlling the coding rate is described in Section D. Lastly, a discussion of boundary adjustments which can be performed to accommodate boundaries appearing within a macroblock and separating low-textured and high-textured areas within the image is presented (Section E).

Section A—Motion Compensation Interframe DCT Coder of the Present Invention

Figure 1:
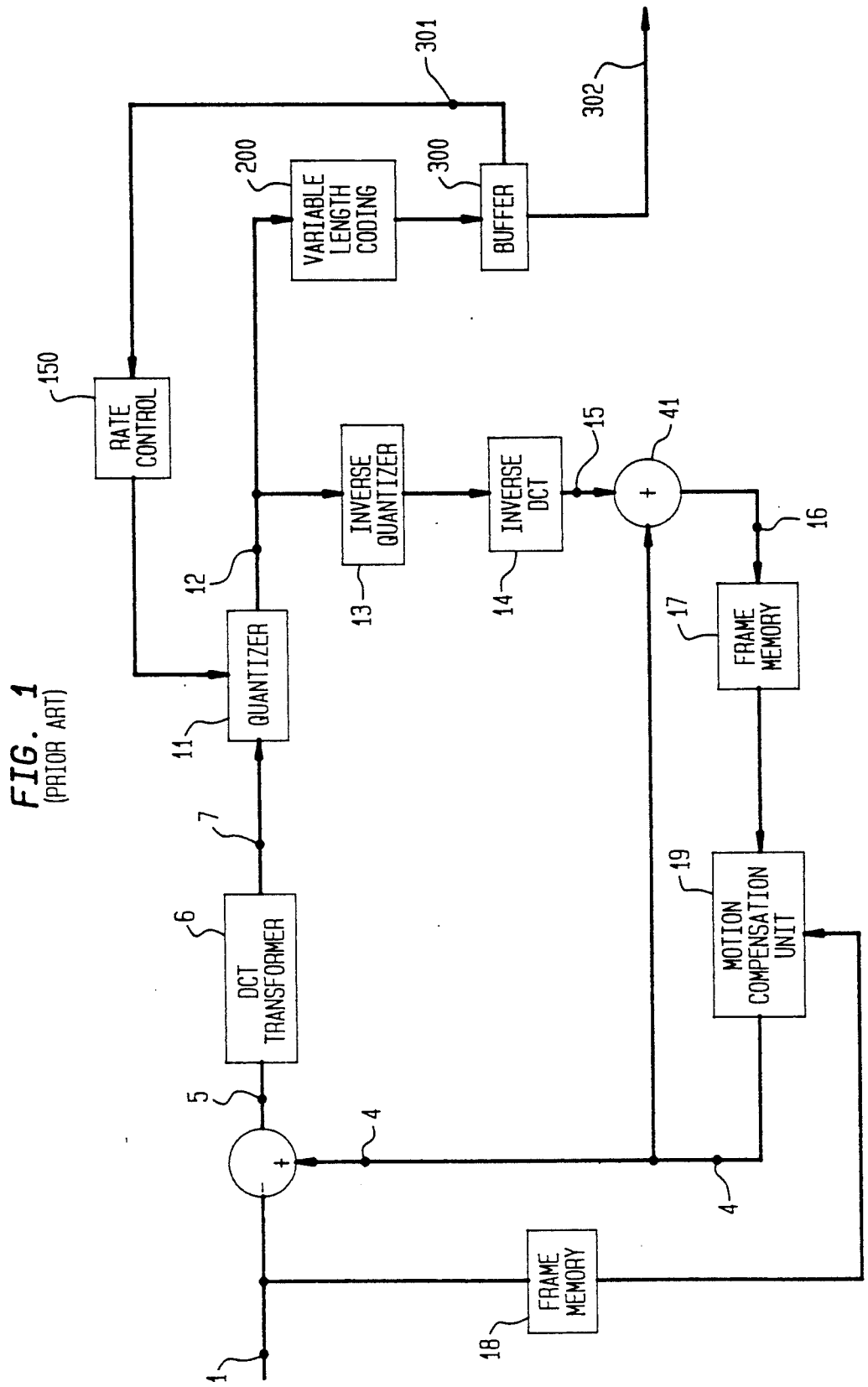
FIG. 1 depicts a motion-compensation DCT interframe coder from the prior art.

FIG. 1 depicts a motion-compensated interframe DCT coder from the prior art. As shown in FIG. 1, the input image signal on lead 1 is combined with the interframe prediction error signal of the input image signal on lead 4 to produce an interframe differential image signal on lead 5. The differential image signal on lead 5 is input for each macroblock to the DCT transformer 6, where the DCT coefficients for the differential image signal are calculated.

In the quantizer 11, the DCT coefficients of the differential image signal for each macroblock appearing at lead 7 are quantized using a quantizer step size determined by the rate controller 150 based upon the buffer occupancy for the previous slice or frame from buffer 300 via lead 301. The quantized differential signal on lead 12 is processed by the inverse quantizer 13 and the inverse DCT transformer 14. A coded image on lead 16 is produced by adding a motion-compensated interframe prediction image signal on lead 4 to the processed differential image signal on lead 15 by adder 41, and stored in a frame memory 17. The image stored in the frame memory 17 is used for interframe prediction at the next frame.

A motion vector used for motion-compensated interframe prediction is calculated by temporarily storing several images in a frame memory 18. The motion vector obtained is used at the motion compensation unit 19. That is, a motion-compensated interframe prediction image is generated by collecting images for each macroblock at positions shifted by the motion vector and is applied at lead 4.

Figure 2:
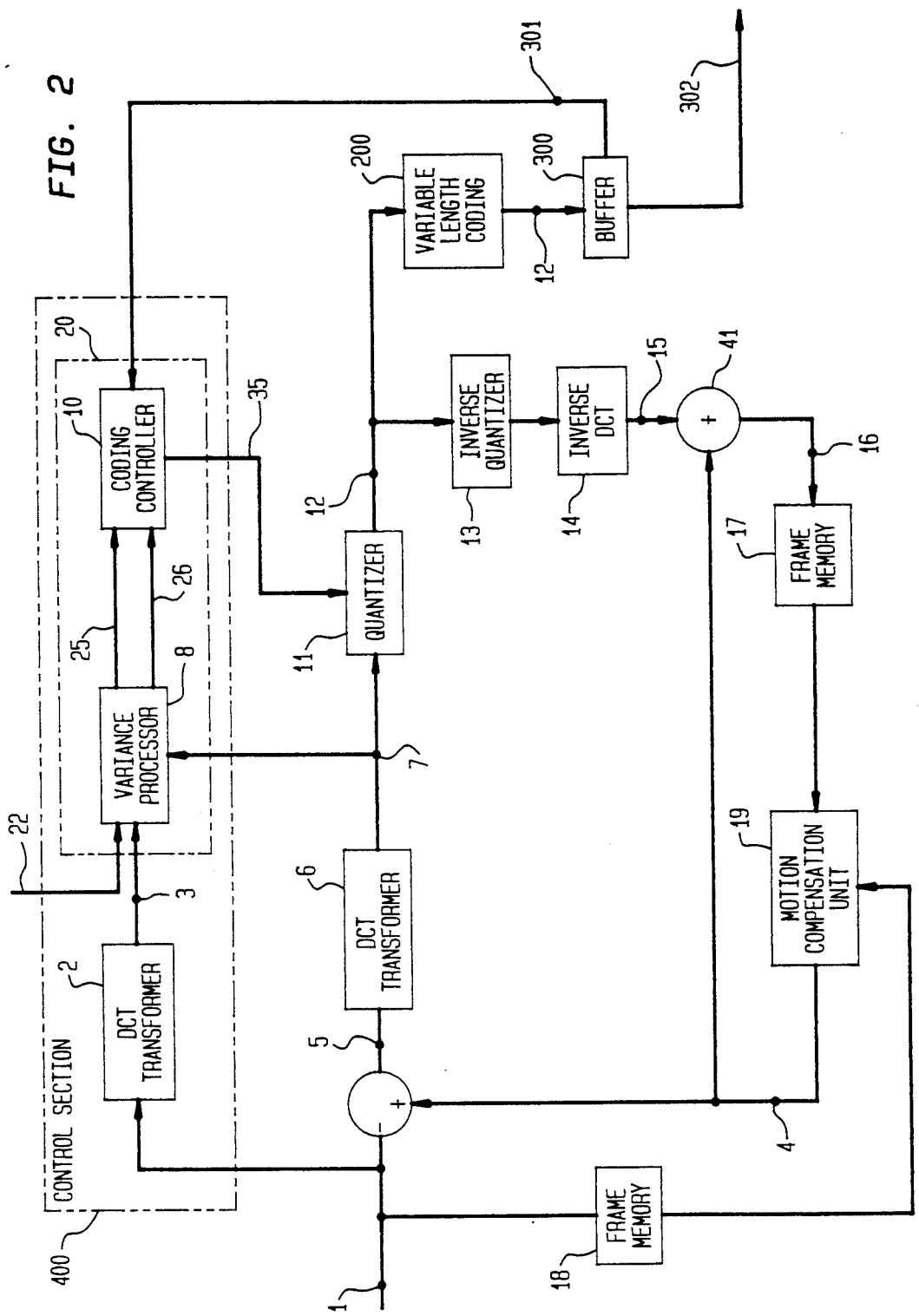
FIG. 2 is a schematic representation of one illustrative embodiment of our invention comprising a motion-compensation interframe DCT coder, which allocates bits, adjusts quantizer step size, and controls the coding rate in accordance with an aspect of this invention.

FIG. 2 depicts a motion-compensated interframe DCT coder in accordance with an embodiment of our invention. In addition to the elements of the prior art coder shown in FIG. 1, our inventive coder has a control section 400 which outputs the quantizer step size to quantizer 11 based upon buffer occupancy as well as the local activity (texture) of the image being coded. DCT coefficients on lead 3 of the input image signal from DCT transformer 2 and the DCT coefficients on lead 7 of the differential image signal from DCT transformer 6 are input to a variance processor 8, which calculates the variances (appearing at leads 25 and 26) of the DCT A-C coefficients for the input image signal and the differential image signal, respectively, of each macroblock. These variances are used to allocate bits and obtain a quantizer step size in a coding controller 10. The variance processor 8 and the coding controller 10 constitute a control block 20.

Figure 3:
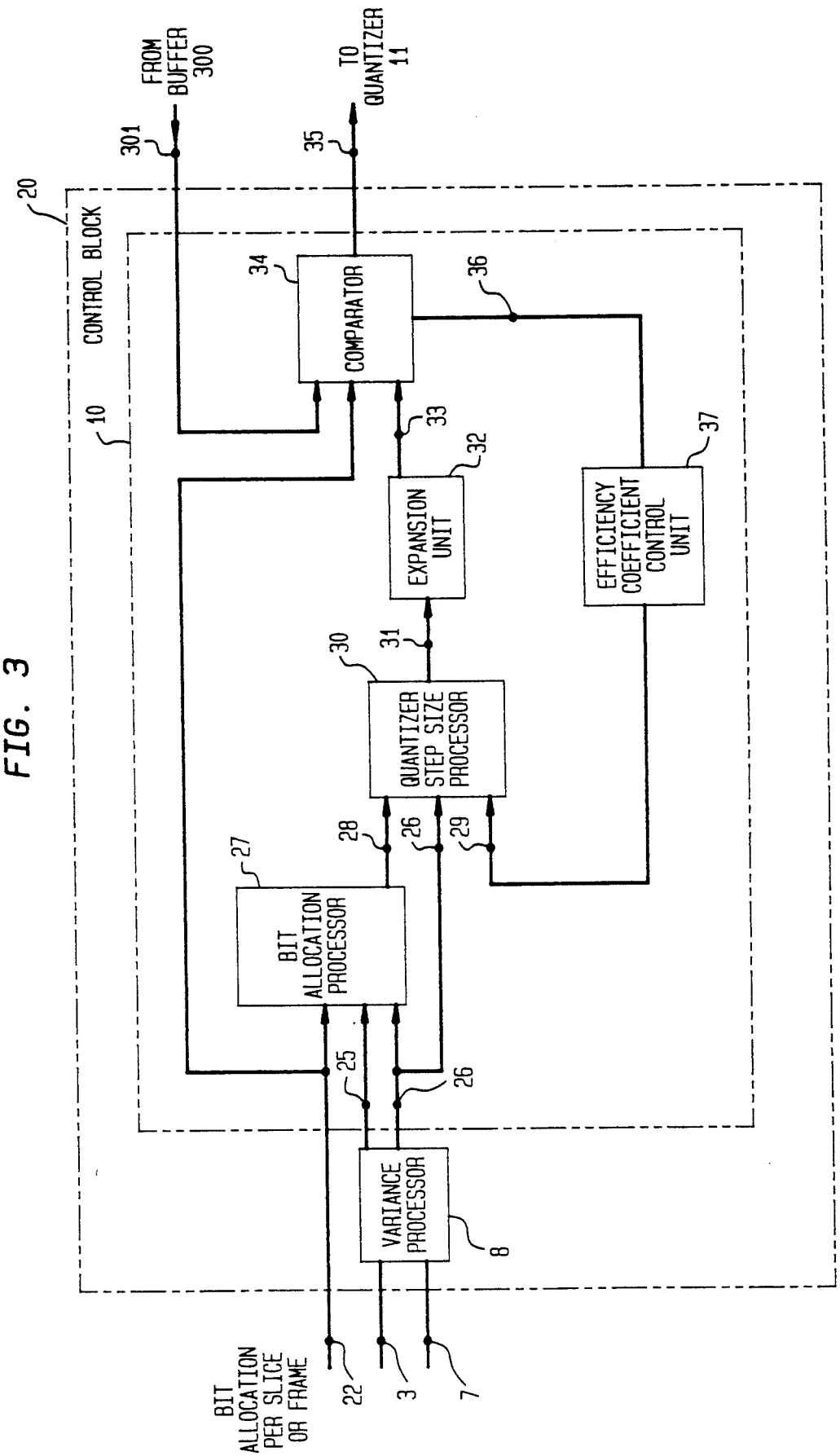
FIG. 3 is a schematic representation of an illustrative embodiment of a coding controller in accordance with an aspect of this invention.
Figure 4D:
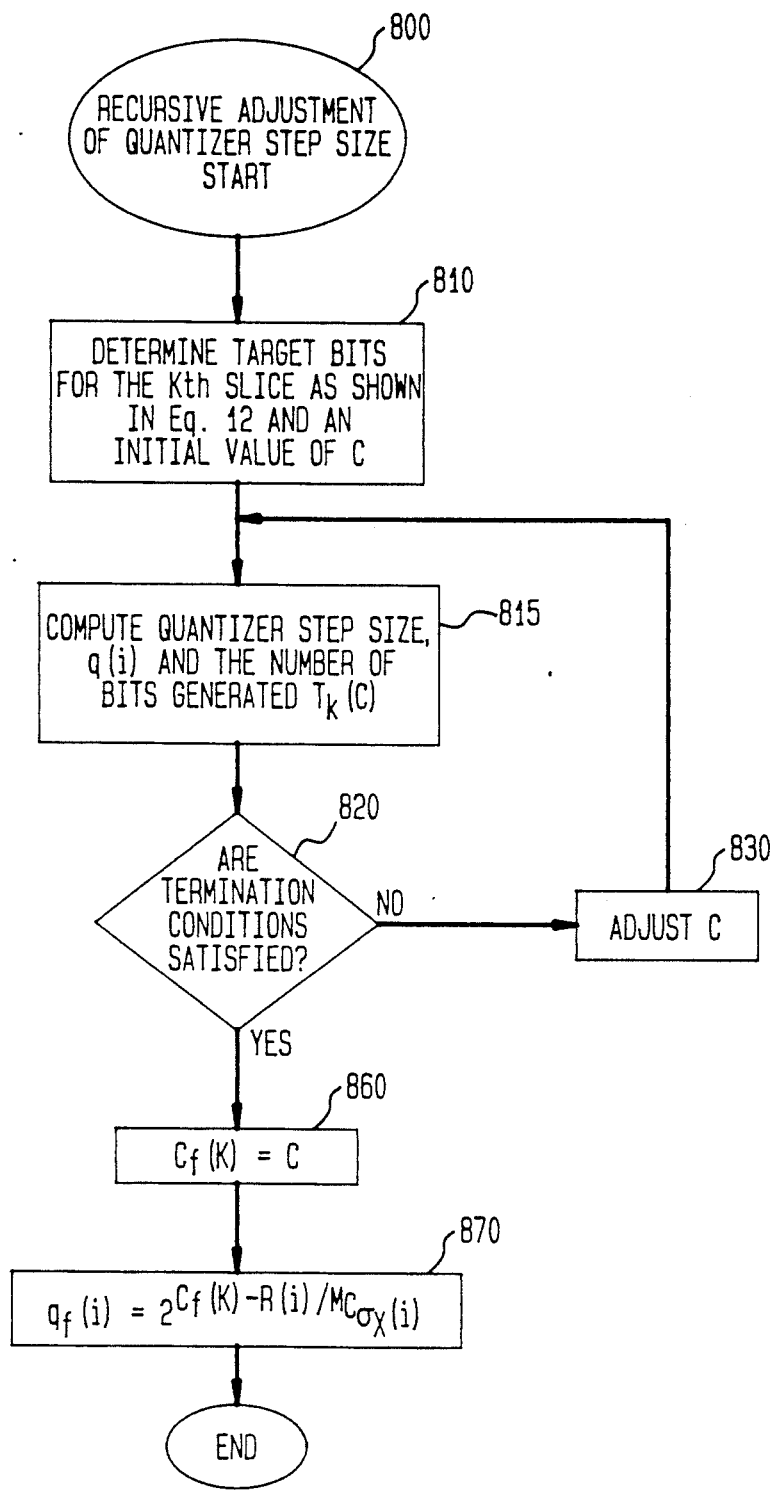

FIG. 3 is an embodiment of the coding controller 10 of our invention which implements a coding control method depicted in FIG. 4A. As shown in FIG. 4A, our coding control method entails allocating bits (step 600) and assigning a quantizer step size (step 700) for each macroblock. The quantizer step size for each macroblock is then recursively adjusted (step 800) to control the coding rate of the coder. The quantizer step size for each macroblock is then input to the quantizer 11 of FIG. 2 (step 900).

As shown in FIG. 3, DCT coefficients on leads 3 and 7 are input to the variance processor 8, which calculates the variance, $\sigma^2_y(i)$, on lead 25 for the DCT A-C coefficient of the i-th macroblock of the input image signal, and a variance, $\sigma^2_x(i)$, on lead 26 for the DCT A-C coefficient of the i-th macroblock of the differential image signal. Here, we assume that the input image is divided into M segments called macroblocks where i=0 to M−1. The variance of the DCT A-C coefficients of the input image signal serves as a good indicator of the activity or texture in the image. The variances per macroblock for the DCT coefficients of the input and differential images, along with the number of bits pre-assigned for coding a slice or frame of the input signal, are input to the bit allocation processor 27. The bit allocation processor 27 then allocates bits for coding each macroblock based upon the number of bits pre-assigned for coding the slice or frame and the texture of the macroblocks, where texture is indicated by the variance of the DCT A-C coefficients of the macroblock. (See Section B).

The initial bit allocation on lead 28, the variance, $\sigma^2_x(i)$, on lead 26 of the DCT coefficients of the differential image from variance processor 8, and the efficiency coefficient, on lead 29, representing the coding efficiency from an efficiency coefficient control unit 37, are input to the quantizer step size processor 30, for each macroblock (See Section D). The processor 30 then calculates the initial value of the quantizing step size for each macroblock. In the quantizer step size expansion component 32, macroblocks having a quantizer step size less than a predetermined threshold value are identified, and the quantizer step size of other macroblocks surrounding the identified macroblock are reset to a predetermined step size. (See Section E).

The quantizing step size on lead 33 from the expansion unit 32 along with the pre-assigned number of allocated bits per slice or frame appearing on lead 22 is input to a comparator 34. The buffer occupancy on lead 301 from buffer 300 is also input to the comparator 34. When the number of generated bits is sufficiently close to, but less than the number of target bits, which is determined based on the buffer occupancy and the number of allocated bits, a final quantizer step size appears at output lead 35. The target bits are defined as the number of pre-assigned bits for coding each slice or frame plus carry-over bits left-over from coding the previous slice or frame.

Otherwise, if the number of bits per slice or frame on lead 36 is not sufficiently close to the target bits, comparator 34 applies a signal on lead 36 to control unit 37 to adjust the efficiency coefficient, C. Incremental changes in the quantizer step size are then made by processor 30 using the new value of the efficiency coefficient, C, to bring the number of bits to be generated per slice or frame closer to the target bits. (See Section D).

Section B—Bit Allocation

The method employed at the bit allocation processor 27 for allocating bits for each macroblock is shown in FIG. 4B (step 600). It is well-known and well-accepted that the human visual sensitivity to quantization distortion of an image is approximately inversely proportional to the local activity in the image. For example, the eye can tolerate more distortion in highly textured areas than smooth (low textured) areas. We have observed that the variance of the A-C coefficients resulting from the DCT of an image signal is a good indicator of the activity in the image (step 610). Assuming that the variance of DCT A-C coefficients in the i-th macroblock of the image is $\sigma^2_y(i)$, it is our objective to keep the quantization distortion in each macroblock proportional to the local variance in the macroblock by holding constant the ratio of the local variance $\sigma^2_y(i)$ to the quantizing distortion in each macroblock as described in Eq. 1 (step 620).

$$\sigma^2_y(i)/D(i) = K \quad (i=0,1,\ldots,M-1) \tag{1}$$

D(i) is the mean square error due to quantization in the i-th macroblock of the prediction error image (in the case of predictive- or bidirectionally predictive-coded pictures) or the input image (in the case of intra-coded pictures), and M is the number of macroblocks in the slice or frame. The effect of the D-C coefficients is assumed to be negligibly small. Assuming that DCT A-C coefficients of a differential image follow a memoryless, zero-mean Gaussian source distribution N (0, $\sigma^2_x(i)$)), it is well own in the art that the number of bits to be allocated for the i-th macroblock R(i) can be expressed based upon Rate Distortion theory as shown in Eq. 2.

$$R(i) = \min\left[R_{max}, \max\left(R_{min}, \frac{1}{2}\log_2\frac{\sigma_x^2(i)}{D(i)}\right)\right], \tag{2}$$

where $\sigma^2_x(i)$ is the variance of the differential image in the i-th macroblock and $R_{max}$ and $R_{min}$ are the maximum and minimum rates corresponding to the allowable maximum and minimum quantizing-step sizes, respectively. Combination of Eqs. (1) and (2) yields the expression shown in Eq. 3.

$$R(i) = \frac{1}{2}\log_2\frac{\sigma_x^2(i)}{\sigma_y^2(i)} + \frac{1}{2}\log_2 K \quad R_{min} < R < R_{max} \tag{3}$$

Assuming that the target bit rate per slice or frame, F, is known, then F can be expressed as shown in Eq. 4.

$$F = \sum_{i=0}^{M-1} R(i) \tag{4}$$

Substitution of Eq. 3 into Eq. 4 yields Eq. 5 shown below.

$$\log_2 K = \frac{2F}{M} - \frac{1}{M}\sum_{i=0}^{M-1}\log_2\frac{\sigma_x^2(i)}{\sigma_y^2(i)} \tag{5}$$

The expression in Eq. 6 for the bit allocation assigned by the bit allocation processor 27 of FIG. 3 to the i-th macroblock, can be obtained by substituting for the value of $\log_2 K$ from Eq. 5 into Eq. 3 (step 630 of FIG. 4B).

$$R(i) = \log_2 \frac{\sigma_x(i)}{\sigma_y(i)} + \frac{F}{M} - \frac{1}{M} \sum_{i=0}^{M-1} \log_2 \frac{\sigma_x(i)}{\sigma_y(i)} \quad (6)$$

Section C—Quantizer Step Size Assignment

Assignment of the quantization step size for a macroblock at the quantizer step size processor 30 (FIG. 3) is dependent upon the bit allocation, R(i) of Eq. 6 (step 710 of FIG. 4C). Assume that the number of coefficients in the i-th macroblock is $M_c$, and the quantization step size in the i-th macroblock is q(i). Since the average dynamic range of each coefficient $\sigma^2_x(i)$, the average number of quantizing levels per coefficient is $\sigma^2_x(i)/q(i)$. From Eq. 6, the average number of levels is $2^{R(i)/M_c}$. Thus, $$2^{R(i)/M_c} = C' \frac{2\sigma_x(i)}{q(i)} \quad (7)$$

where C' is the coding efficiency factor. C' takes into account the coding efficiency gain resulting from the use of two-dimensional VLCs, the bits needed for D-C coefficients quantization, motion vector data, and overhead information that needs to be included in the overall bit rate. Eq. (7) can be re-written as shown in Eq. 8 (step 710) where C approximates the logarithm of C' as defined as shown in Eq. 9.

$$q(i) = 2^{C - R(i)/M_c} \sigma_x(i) \quad (8)$$

$$C = 1 + \log_2 C' \quad (9)$$

Eq. 8 indicates that the quantizing step size, q(i), can be adjusted by changing C. In practice, the quantizer step size is restricted to a given range as stated in Eqs. 10 and 11 (steps 720–760).

$$q(i) = q_{min} \text{ when } q(i) \leq q_{min} \quad (10)$$

$$q(i) = q_{max} \text{ when } q(i) \geq q_{max} \quad (11)$$

The values of $q_{max}$ and $q_{min}$ are selected such that bits are not wasted in low-texture areas and high-texture areas do not exhibit quantization distortion. Eq. 8 will yield a suitable quantization step size even if the coefficients are not statistically Gaussian as assumed earlier, although the bit allocation may no longer be perfectly optimal. In Eq. 8, one can note that the quantizer step size is proportional to the standard deviation of the coefficients in the differential image.

Section D—Recursive Adjustment of Quantizer Step Size

In our inventive method, the coding rate is controlled by adjusting the quantization step size, q(i), by changing C, which is defined in Eq. 9. Below, we describe a recursive method of adjusting C based on the target bits for a slice or frame and the buffer occupancy. Adjustments in C can be made frequently by invoking slice-by-slice control or less frequently employing frame-by-frame control. For the purpose of an illustrative example, we will describe the recursive method in the context of slice-by-slice control.

First, we assume that the number of bits allocated for coding the k-th slice is $F_k$ and the number of bits used for actual coding is $T_k(C)$. The number of carryover bits from coding the k−1th slice, $P_{k-1}$, is the difference between the number of bits actually used for coding the k−1th slice, $T_{k-1}(C)$, and the number of bits allocated for coding the k−1th slice $F_{k-1}$. Therefore, the number of target bits for the kth slice is as shown in Eq. 12 (step 810).

$$F_k + P_{k-1} \quad (12)$$

The carryover bits from the k−1th slice can be used for coding the kth slice. The quantizer step sizes are now computed, and the number of bits actually generated for the slice T sub k (C) is computed. The value of C can be calculated recursively by repeating the following method mathematically described in Eqs. 13 and 14 (steps 815, 820, and 830).

$$C \leftarrow C + \delta \text{ when } T_k(C) > F_k + P_{k-1} \quad (13)$$

$$C \leftarrow C - \delta \text{ when } T_k(C) < F_k + P_{k-1} \quad (14)$$

Therefore, C is incrementally changed by δ until the number of bits actually generated for coding the k-th slice is less than the number of target bit for the k-th slice (step 830). The recursion terminates when the maximum $T_k(C)$ which does not exceed the target bits is found (step 820). $C_f(k)$, as expressed in Eq. 15 below, is the final coding efficiency for the k-th slice (step 860), $P_k$, as expressed in Eq. 16 is the number of carry over bits for the k+1th slice, and $q_f(i)$, as expressed in Eq. 17, is the final quantizer stepsize $q_f(i)$.

$$C_f(k) = \arg \left[ \max_c (T_k(C)) \right] \text{ where } T_k(C) \leq F_k + P_{k-1} \quad (15)$$

$$P_k = F_k + P_{k-1} - T_k(c) \quad (16)$$

$$q_f(i) = 2^{C_f(k) - R(i)/M_c} \sigma_x(i) \quad (17)$$

Using this recursive method, a value of C is obtained that yields a quantizer step size that satisfies the condition that the number of bits actually generated do not exceed the target bits, but is as close to the target bits as possible.

Section E—Boundary Adjustment Method

Under the coding control method of our invention, a large quantizing step size, q(i), is generally allocated to a macroblock having a number of large DCT A-C coefficients, such as an image having a high texture pattern. An area of an image where the pattern texture changes sharply, such as at the boundary between a high texture object and a smooth (low texture) background, tends to yield large A-C coefficients resulting in a large variance and a large quantizer step size. Where a low texture pattern and a high texture pattern are both contained in the same macroblock, application of a small quantizer step size results in pronounced quantizing distortions in the low texture portion. Distortion is apparent at such boundaries because some intermediate value of q(i), between that appropriate for a low texture area and a high texture area, is used. Therefore, the low texture area is too coarsely quantized and the high texture area is insufficiently quantized resulting in distortion being visible near such boundaries. To prevent this pronounced effect, a smaller quantizer step size is required in macroblocks connected to a low texture area.

Figure 5A:
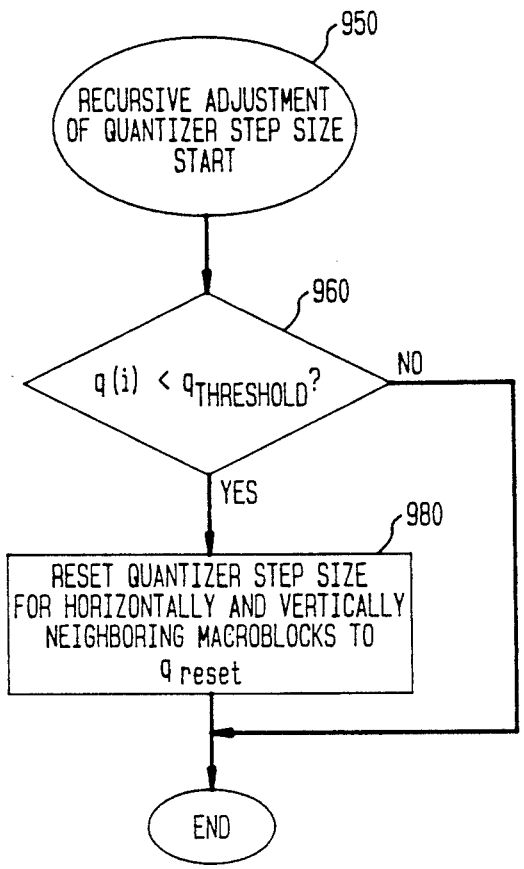
FIGS. 5A and 5B depict an illustrative representation of the implementation of our boundary adjustment method.

An additional aspect of the method described above for controlling the coding rate is a method for identifying macroblocks containing such boundaries and assigning a minimum quantization step size for the identified macroblock and certain other neighboring macroblocks (see FIG. 5A). A method for detecting a boundary within a macroblock between a high and low texture area entails comparing the value of q(i) for neighboring macroblocks against a predetermined threshold quantizer step size, $q_{threshold}$ (step 960). If a macroblock is detected having q(i) $q_{threshold}$, then the area is expanded in the horizontal and vertical directions by one macroblock (step 980). Specifically, when the quantizer step size for a macroblock is less than $q_{threshold}$, the quantizer step sizes for the adjoining macroblocks are reset to $q_{reset}$. The reset value may be equal to quantizer step size of the identified macroblock, to $q_{min}$, or any predetermined value.

Figure 5B:
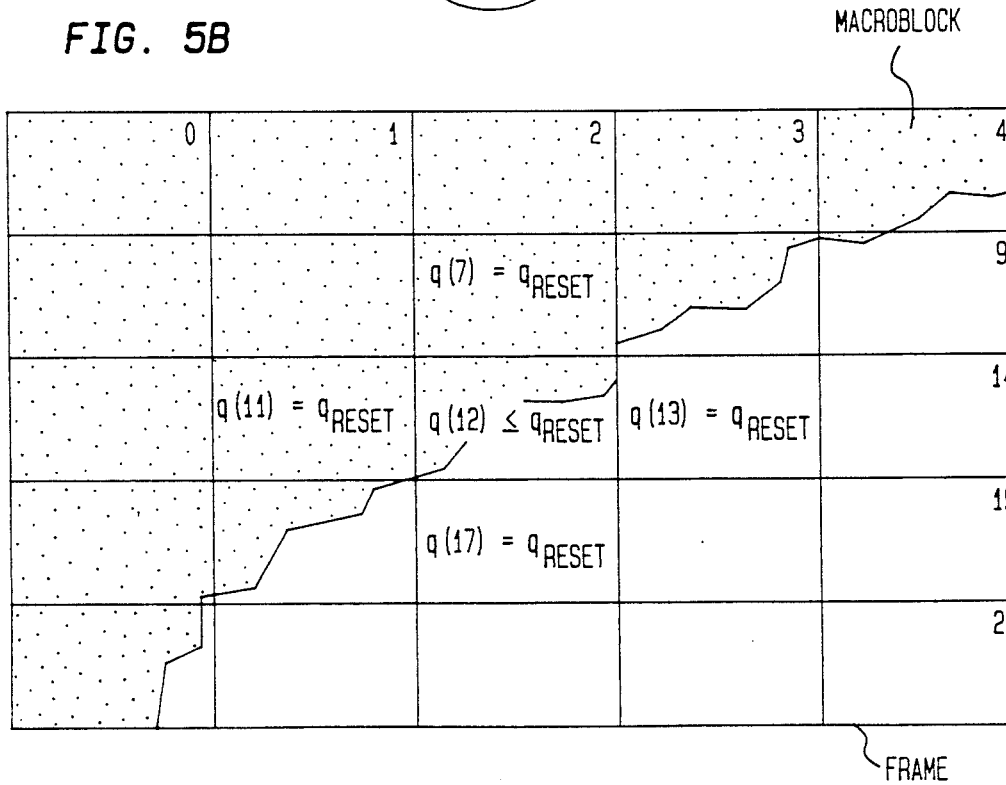

As an illustrative example shown in FIG. 5B, a frame of video is divided into macroblocks, i, where i=0 to 24. Each macroblock has been assigned a quantizer step size of q(i). Assume that macroblock 12 has a boundary between a low and high texture area and is identified as having a quantizer step size less than $q_{threshold}$. Then, the quantizer step size for macroblocks 7, 11, 13, and 17 will be reset to $q_{reset}$ as shown in FIG. 5B.

CONCLUSION

Thus, a motion compensating coder employing an inventive coding controller and image coding method has been disclosed. Our coder permits improved picture quality and network efficiency by allocating bits and setting quantizer step size based upon buffer occupancy and the texture of the signal being coded and by maintaining a target bit rate for each slice or frame by using a recursive control method. Additionally, our coder makes adjustments in the quantizer step size to minimize the effect of distortion occurring at boundaries between low-textured and high-textured areas in the image. Numerous other alternative embodiments of the present invention may be devised without departure from the spirit and scope of the following claims.

What is claimed is:

1. An image coder employing motion-compensation techniques for coding input signals having multiple textures, comprising:
    means for coding input signals including
        means for generating a prediction signal of the input signal,
        means, connected to said generating means, for combining the input signal and said prediction signal,
        first circuitry connected to said combining means and including means for transforming and means for quantizing said combined signals, said transforming means generating coefficients representing said combined signal, and
        second circuitry connected to said first circuitry and including means for encoding and means for buffering said transformed and quantized signal, said buffering means generating buffer occupancy information; and
    a control section connected to said quantizer means and said buffering means and including means for receiving the input signal, for generating a quantizer step size based upon said buffer occupancy information received from said buffering means and the texture of the input signal, and for applying said quantizer step size to said quantizing means, wherein said control section further includes means, responsive to the input signal, for transforming the input signal and generating coefficients representing the input signal and
    a variance processor which receives and processes said coefficients of said input signal transforming means and produces a first variance for said coefficients of the input signal, said first variance indicating the texture of the input signal.

2. The image coder of claim 1 wherein said variance processor also receives and processes coefficients from said combined signal transforming means and produces a second variance for said coefficients of said combined signal.

3. The image code of claim 2 wherein said control section further includes a coding controller connected to said variance processor, said buffering means, and said quantizing means, said coding controller including
    means for determining at least one bit allocation for the input signal,
    means for generating at least one quantizer step size for the input image, and
    means for adjusting said quantizer step size to control a coding rate of the input signal.

4. An image coder employing motion-compensation techniques for coding input signals having multiple textures, comprising:
    means for coding input signals including
        means for generating a prediction signal of the input signal,
        means, connected to said generating means, for combining the input signal and said prediction signal,
        first circuitry connected to said combining means and including means for transforming and means for quantizing said combined signals, said transforming means generating coefficients representing said combined signal, and
        second circuitry connected to said first circuitry and including means for encoding and means for buffering said transformed and quantized signal, said buffering means generating buffer occupancy information; and
    a control section connected to said quantizer means and said buffering means and including means for generating a quantizer step size based upon said buffer occupancy information received from said buffering means and the texture of the input signal and for applying said quantizer step size to said quantizing means wherein said control section includes
    means, responsive to said input signal, for transforming the input signal and generating coefficients representing the input signal,
    a variance processor which receives and processes said coefficients from said input signal transforming means and coefficients from said combined signal transforming means and produces a first variance for said coefficients of said input signal and a second variance for said coefficients of said combined signal, and
    a coding controller connected to said variance processor, said buffering means, and said quantizing means and which includes means for determining at least one bit allocation for the input signal, means for generating at least one quantizer step size for the input image, and means for adjusting said quantizer step size to control a coding rate of the input signal.

5. The image coder of claim 4 wherein said adjusting means comprises means for recursively adjusting said quantizer step size until a maximum number of bits used for coding the input signal is generated which maximum number does not exceed a pre-determined target number of bits.

6. The coder of claim 4 wherein said input signal is divisible into segments and said coding controller further comprises means for identifying segments in the input signal having a boundary between areas of differing textures and a quantizer step size below a pre-determined minimum level and means for resetting said quantizer step size of segments in proximity to said identified segments to a pre-determined reset value, such that the visible distortion at said boundary is reduced.

7. The coder of claim 6 wherein said resetting means operates on segments being horizontally adjacent to said identified segments and segments being vertically adjacent to said identified segments.

8. The coder of claim 6 wherein said reset value is equal to said quantizer step sizes of said identified segments.

9. The coder of claim 6 wherein said reset value is equal to a minimum quantizer step size pre-determined for the coder.

10. A method of coding an input signal having multiple textures and being divisible into a plurality of segments, comprising the steps of:

generating a prediction signal of the input signal;

combining the input signal and said prediction signal to form a combined signal;

transforming said combined signal to produce coefficients of said combined signal;

quantizing said combined signal;

coding and buffering said quantized combined signal in a buffer;

tracking buffer occupancy of said buffer;

transforming the input signal to produce coefficients of said input signal;

determining the texture of the segments of the input signal by processing said coefficients of said combined signal and said coefficients of said input signal and producing a first variance and a second variance, respectively for each segment;

allocating a number of bits for coding each segment of the input image based upon said first and second variances corresponding to each segment and a number of bits pre-allocated for coding the input signal;

assigning a quantizer step size for each segment based upon said allocated bits in said allocating step for the segment;

recursively adjusting said quantizer step size of said assigning step based upon said tracked buffer occupancy; and controlling said quantizing step based upon said quantizer step size from said adjusting step.

11. A method of controlling a coding rate of a motion compensating coder, the coder being responsive to an input, having a prediction signal and a pre-allocated number of bits for coding an input signal and tracking occupancy of a buffer holding coded signals, the input signal having multiple textures and being divisible into a plurality of segments, comprising the steps of:

transforming a combined signal of the input signal and the prediction signal to produce coefficients of said combined signal;

transforming the input signal to produce coefficients of said input signal;

determining the texture of the segments of the input signal by processing said coefficients of said combined signal and said coefficients of said input signal and producing a first variance and a second variance, respectively for each segment;

allocating a number of bits for coding each segment of the input signal based upon said first and second variances corresponding to each segment and the number of bits pre-allocated for coding the input signal;

assigning a quantizer step size for each segment based upon the allocated bits in said allocating step for the segment;

recursively adjusting the quantizer step sizes of said assigning step based upon the buffer occupancy; and controlling the coding rate at the coder by inputting thereto the adjusted quantizer step sizes.

12. The method of claim 11 of controlling a coding rate of a motion compensating coder of further comprising the step of:

terminating said adjusting step when a maximum number of bits used for coding the input signal is generated which maximum number does not exceed the pre-allocated number of bits.

13. The method of claim 11 controlling a coding rate of a motion compensating coder further comprising the steps of:

identifying segments in the input signal having boundaries between areas of differing textures and said quantizer step sizes of said assigning step below a predetermined minimum level; and resetting said quantizer step sizes of segments in proximity to said identified segments to pre-determined reset values, such that the visible distortion at said boundary is reduced.

14. The method of claim 13 controlling a coding rate of a motion compensating coder wherein said resetting step includes operating on segments being horizontally adjacent to said identified segments and segments being vertically adjacent to said identified segments.

* * * * *